(12) United States Patent
Dyle Kim

(10) Patent No.: US 10,363,855 B2
(45) Date of Patent: Jul. 30, 2019

(54) BEVERAGE CONTAINER HOLDING ASSEMBLY

(71) Applicant: GM GLOBAL TECHNOLOGY OPERATIONS LLC, Detroit, MI (US)

(72) Inventor: Taryn Dyle Kim, Detroit, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 45 days.

(21) Appl. No.: 15/828,892

(22) Filed: Dec. 1, 2017

(65) Prior Publication Data

US 2019/0168653 A1 Jun. 6, 2019

(51) Int. Cl.
*B60N 3/10* (2006.01)

(52) U.S. Cl.
CPC ............. *B60N 3/106* (2013.01); *B60N 3/108* (2013.01)

(58) Field of Classification Search
CPC ........ B60N 3/106; B60N 3/108; B60N 3/101; B60N 3/105; B60N 3/107; B60N 3/102; B60N 3/10; B60N 3/103; B60N 2/793; A47G 23/0216; A47G 2400/086; Y10S 224/926; Y10S 403/7007; B62B 2202/023
USPC ....................................................... 224/544
See application file for complete search history.

(56) References Cited

U.S. PATENT DOCUMENTS

| 6,070,844 | A  | * | 6/2000 | Salenbauch | ........ | A47G 23/0216 |
| | | | | | | 248/311.2 |
| 6,834,838 | B2 | * | 12/2004 | Dennis | ................... | B60N 3/102 |
| | | | | | | 248/311.2 |
| 2005/0189459 | A1 | * | 9/2005 | Sturt | ...................... | B60N 3/106 |
| | | | | | | 248/309.1 |

* cited by examiner

*Primary Examiner* — Nathan J Newhouse
*Assistant Examiner* — Matthew T Theis

(57) ABSTRACT

A beverage container holder that includes a first member including a floor, sidewall, and first opening, the floor connected and spaced apart from the first opening by the first member sidewall to define a receptacle to receive the beverage container therein; a second member, where a portion of the second member is inserted into the first opening of the first member to permit rotation of the second member about a center axis; a plurality of elastic bands, each elastic band of the plurality of elastic bands being connected to the first member at one end and the second member at the opposite end such that tension is established within each elastic band of the plurality of elastic bands; and the plurality of nylon bands collaborate to operatively form into a configuration which constricts an area centrally located in the receptacle of the first member.

15 Claims, 4 Drawing Sheets

BEVERAGE CONTAINER HOLDING ASSEMBLY

INTRODUCTION

It is known to provide a beverage container holder for a vehicle. However, due to the varying widths of beverage containers, it is desirable to provide a new beverage container holding assembly for a vehicle. It is also desirable to provide a holding assembly that is adjustable to accommodate containers of various widths. It is further desirable to adapt such a holding assembly to be installed within a vehicle interior. Therefore, there is a need in the art to provide a beverage container holding assembly for a vehicle that meets these desires.

SUMMARY

One general aspect includes a beverage container holder that includes a first member including a floor, sidewall, and first opening, the floor connected and spaced apart from the first opening by the first member sidewall to define a receptacle to receive the beverage container therein; a second member, where a portion of the second member is inserted into the first opening of the first member to permit rotation of the second member about a center axis; a plurality of elastic bands, each elastic band of the plurality of elastic bands being connected to the first member at one end and the second member at the opposite end such that tension is established within each elastic band of the plurality of elastic bands; and where, as the second member is caused to rotate about the center axis, the tension in each nylon band grows and the plurality of nylon bands collaborate to operatively form into a configuration which constricts an area centrally located in the receptacle of the first member.

Implementations may include one or more of the following features. The beverage container holder where the second member includes a second opening, sidewall, and third opening, the second opening connected and spaced apart from the third opening by the second member sidewall to define a rounded sleeve to surround a portion of the beverage container when the beverage container is received by the receptacle of the first member. The beverage container holder where each of the elastic bands are connected to the first member sidewall and the second member sidewall. The beverage container holder where: the first member sidewall further includes a track having a plurality of side notches. The beverage container holder may also include the second member sidewall includes a retention feature that projects outward, the retention feature can travel along the track of the first member sidewall as the second member is caused to rotate about the center axis, the retention feature is adapted to engage each of the side notches, and where retention feature engagement for each side notch causes the second member to maintain a releasably static position during rotation about the center axis. The beverage container holder where the first member sidewall further includes a first edge having a first diameter to define the first opening of the first member, a first surface, and a second edge having a second diameter, the first edge connected and spaced apart from the second edge by the first surface, and the first diameter is larger than the second diameter. The beverage container holder where the first member sidewall further includes a second surface, third surface, and third edge having a third diameter, the second edge connected to and spaced apart from the third edge by the second surface and third surface, the second surface is diagonally oriented in relation to the second edge and the third surface, and the second diameter is larger than the third diameter. The beverage container holder where the second member further includes a lateral lip projecting outward from the second opening, the lip borders the first edge of the first member sidewall and covers the first surface of the first member sidewall. The beverage container holder where a gasket is positioned on the first surface of the first member to separate the first member and second member via the lip. The beverage container holder where the gasket is made from elastomeric material. The beverage container holder where the first member is molded into a surface of a vehicle interior. The beverage container holder where each elastic band is connected to the first member via a washer. The beverage container holder where each elastic band is made from nylon.

One general aspect includes a beverage container holder including: a first member molded into a surface of a vehicle interior, the first member including a floor, sidewall, and first opening, the floor connected and spaced apart from the first opening by the first member sidewall to define a rounded receptacle to receive the beverage container therein; the first member sidewall includes a track having a plurality of side notches, a first edge having a first diameter to define the first opening of the first member, a first surface, and a second edge having a second diameter, the first edge connected and spaced apart from the second edge by the first surface, and the first diameter is larger than the second diameter; the first member sidewall further includes a second surface, third surface, and third edge having a third diameter, the second edge connected to and spaced apart from the third edge by the second surface and third surface, the second surface is diagonally oriented in relation to the second edge and the third surface, and the second diameter is larger than the third diameter; a second member including a second opening, sidewall, and third opening, the second opening connected and spaced apart from the third opening by the second member sidewall to define a rounded sleeve, the sleeve is inserted into the first opening of the first member to permit rotation of the second member about a center axis, and the second member sleeve surrounds a portion of the beverage container when the beverage container is received by the receptacle of the first member; the second member further includes a lateral lip projecting outward from the second opening of the second member, the lip borders the first edge of the first member sidewall and covers the first surface of the first member; the second member sidewall includes a retention feature that projects outward, the retention feature can travel along the track of the first member sidewall as the second member is caused to rotate about the center axis, the retention feature is adapted to engage each of the side notches, and where retention feature engagement for each side notch causes the second member to maintain a releasably static position during rotation about the center axis; an elastomeric gasket positioned on the first surface of the first member to separate the first member and second member via the lip; a plurality of nylon bands, each nylon band of the plurality of nylon bands being connected to the first member sidewall at one end via a washer and the second member sidewall at the opposite end such that tension is established within each nylon band of the plurality of nylon bands; and where, as the second member is caused to rotate about the center axis, the tension in each nylon band grows and the plurality of nylon bands collaborate to operatively form into a configuration which constricts an area centrally located in the receptacle of the first member.

One general aspect includes a surface positioned in an interior of a vehicle, the surface including: a first member molded into the surface, the first member including a floor, sidewall, and first opening, the floor connected and spaced apart from the first opening by the first member sidewall to define a rounded receptacle to receive the beverage container therein; the first member sidewall includes a first edge having a first diameter to define the first opening of the first member, a first surface, and a second edge having a second diameter, the first edge connected and spaced apart from the second edge by the first surface, and the first diameter is larger than the second diameter; the first member sidewall further includes a second surface, third surface, and third edge having a third diameter, the second edge connected to and spaced apart from the third edge by the second surface and third surface, the second surface is diagonally oriented in relation to the second edge and the third surface, and the second diameter is larger than the third diameter; the first opening adapted to receive a rounded sleeve of a second member and permit rotation of the second member about a center axis, the sleeve including a second opening, sidewall, and third opening, the second opening connected and spaced apart from the third opening by the second member sidewall to define the sleeve, and the sleeve being adapted to surround a portion of the beverage container after the beverage container is received by the receptacle of the first member; the first member sidewall adapted to connect to one end of each elastic band of a plurality of elastic bands, where the opposite end of each elastic band of the plurality of elastic bands is connected to the second member sidewall such that tension is established within each elastic band of the plurality of elastic bands when the sleeve of the second member is received by the first opening, and where, as the second member is caused to rotate about the center axis, the tension in each elastic band grows and the plurality of elastic bands are caused to collaborate to operatively form into a configuration which constricts an area centrally located in the receptacle of the first member.

The surface where the first member sidewall further includes: a track having a plurality of side notches; the second member sidewall includes a retention feature that projects outward; the track adapted to allow the retention feature to travel along a defined path as the second member is caused to rotate about the center axis and to allow engagement with each of the side notches to cause the second member to maintain a releasably static position during rotation about the center axis. The surface where the second member further includes: a lateral lip projecting outward from the second opening; the first edge of the first member sidewall adapted to borders the perimeter of the lip after the first opening receives the sleeve of the second member; and the first surface of the first member sidewall adapted to be covered by the lip after the first opening receives the sleeve of the second member. The surface where each elastic band can be connected to the first member via a washer. The surface where the first surface is adapted to include a gasket to separate the first member from the second member after the first opening receives the sleeve of the second member. The surface where the gasket is made from elastomeric material. The surface where each elastic band is made from nylon.

The above features and advantages and other features and advantages of the present teachings are readily apparent from the following detailed description for carrying out the teachings when taken in connection with the accompanying drawings.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
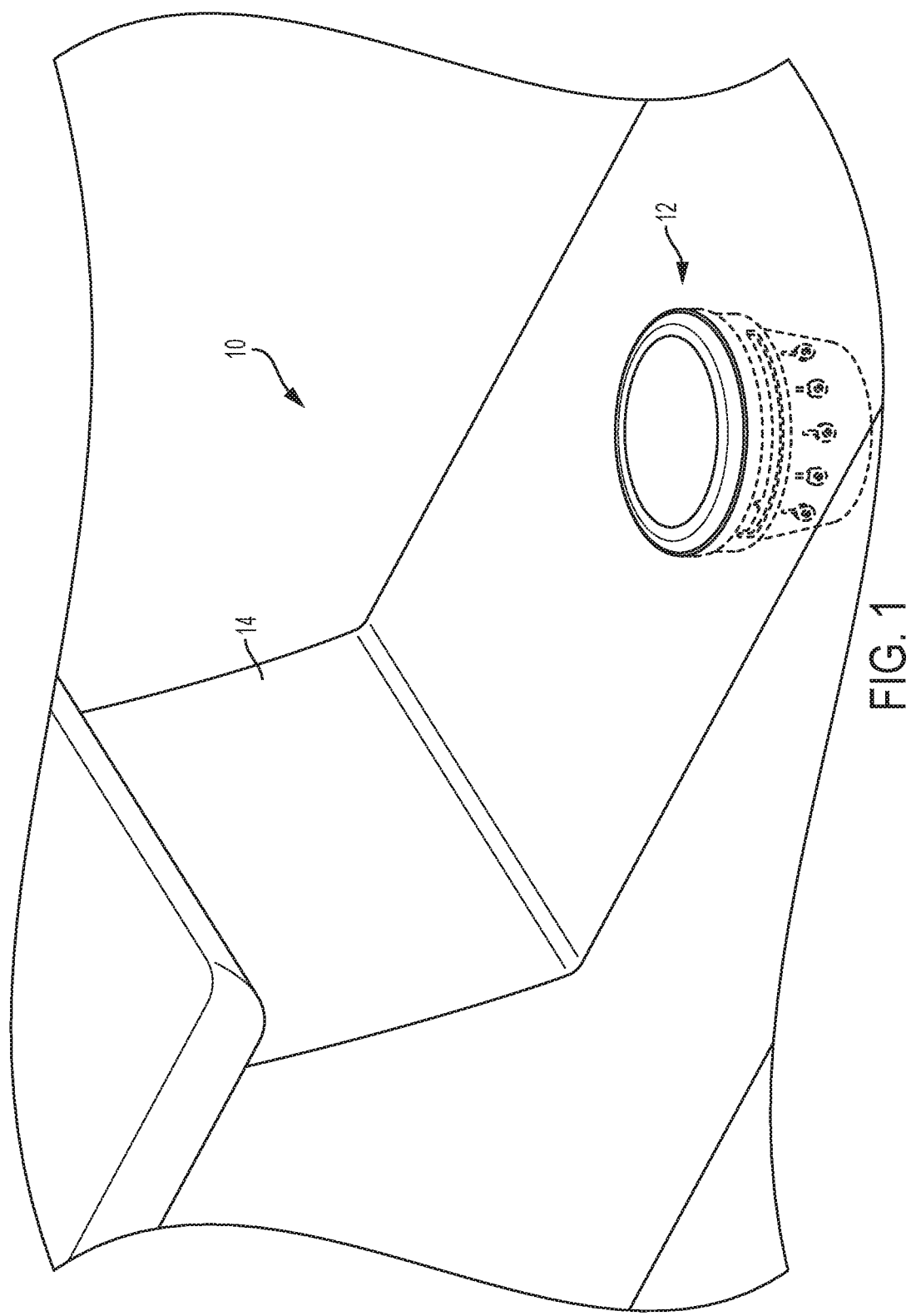
FIG. 1 shows an environment in which an exemplary beverage container holding assembly may be implemented according one aspect.

Referring to FIG. 1, the interior of a vehicle is generally indicated at 10 and includes a beverage container holding assembly 12 installed onto a center console 14, which is generally positioned between the vehicle operator seat and the vehicle passenger seat (not shown). Holding assembly 12 is adjustable to accommodate beverage containers of various sizes, in particular, of different widths. For example, a vehicle passenger/operator may have their holding assembly 12 hold a variety of beverage containers such as, but not limited to, coffee cups, cans, juice boxes, fountain drink cups, and insulated bottles. In order to adapt the assembly 12 to hold a container of a certain width, a vehicle passenger simply needs to rotate the installed holding assembly 12 via, for example, a sleeve member 16 which may bulge above the surface of console 14. It should also be understood that holding assembly 12 may also be installed at other locations within the vehicle interior 10 such as, but not limited to, the vehicle's dash board (not shown), a vehicle seat (not shown), a vehicle seat armrest (not shown), or on the side of a vehicle door (not shown).

Figure 2:
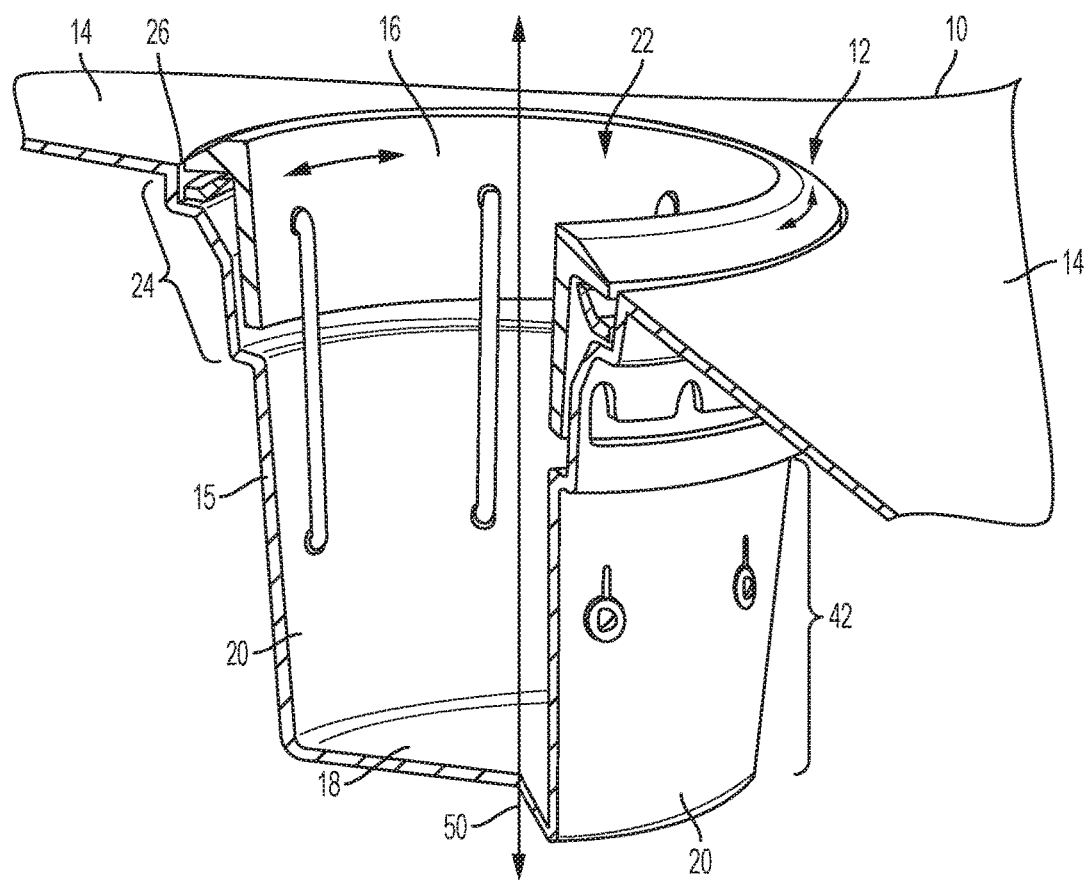
FIG. 2 shows a peripheral cutaway view of an exemplary beverage container holding assembly according to one aspect.
Figure 3:
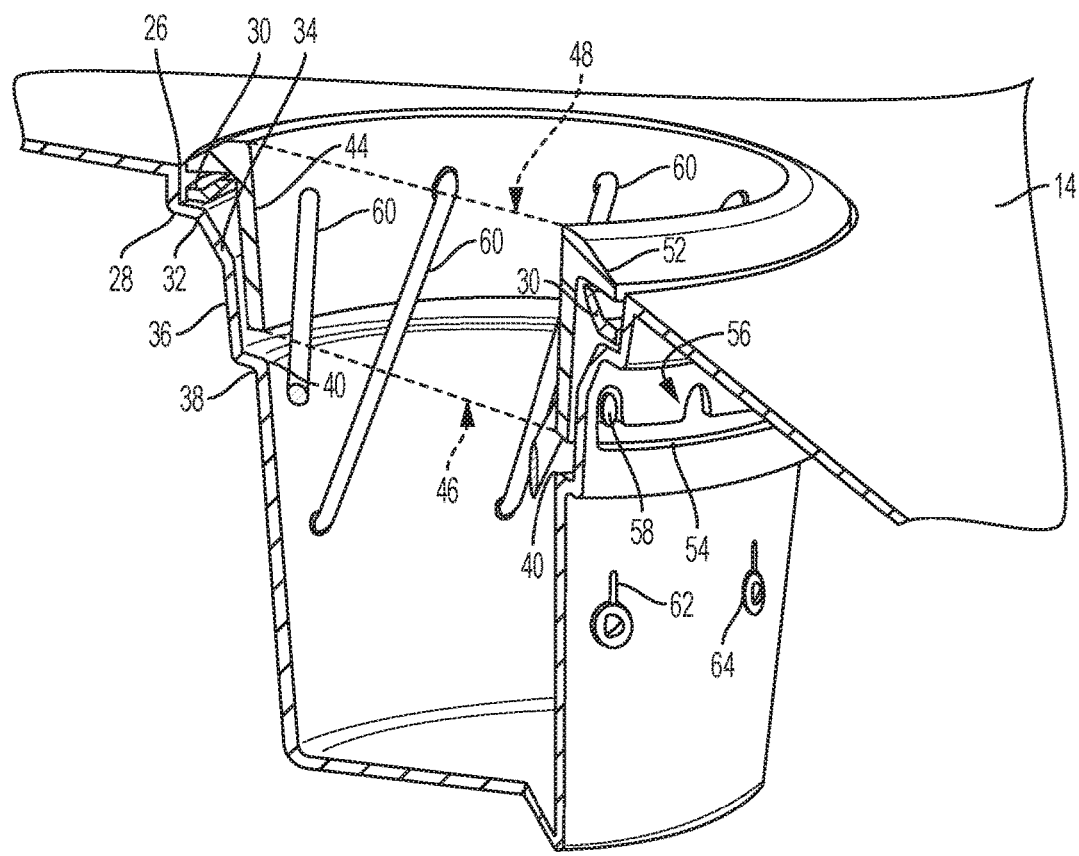
FIG. 3 shows a peripheral cutaway view of the exemplary beverage container holding assembly of FIG. 2 according to another aspect.

As shown in FIGS. 2 and 3, the beverage container holding assembly 12 includes a receptacle member 15 (i.e., a first member) and a sleeve member 16 (i.e., a second member). When properly installed into the vehicle interior 10, the receptacle 15 is molded onto a substantially horizontal surface of the center console 14 and generally has a rounded cup shape to receive and hold various beverage containers. Moreover, receptacle 15 includes a floor 18 and receptacle sidewall 20 of a substantially circular cross section. As such, to define its cup shape, floor 18 is moldably connected to and vertically spaced apart from a receptacle opening 22 by sidewall 20. Thus, when a beverage container is placed in receptacle 15, it will rest on floor 18 and held upright by sidewall 20, so that the container may extend out of opening 22. Receptacle 15 may also be made of a rigid material, and of a similar material as the center console 14, such as, but not limited to, plastic, metal, fiberglass, or wood.

An upper portion 24 of the receptacle sidewall 20 has a substantially tapered shape, being defined by a series of edges and surfaces. For instance, starting from the surface of the center console 14 and moving towards floor 18, opening 22 is defined by a first edge 26 having a diameter wide enough to surround the perimeter of sleeve 16. Beneath first edge 26 sits a first surface 28 in which a gasket 30 can rest upon. At the inward facing end of first surface 28 is a second edge 32 with a diameter that is smaller than the diameter of the first edge 26 by the length of first surface 28 (e.g., three millimeters). First edge 26 is thus moldably connected to and spaced apart from second edge 32 by first surface 28. Extending from second edge 32 is a diagonal second surface 34, a vertical wall section 36, and a horizontal third surface 38 that ends at a third edge 40. The third edge 40 has a diameter that is smaller than the diameter of the second edge 32 by the full length created by the arrangement of second surface 34, wall section 36, and third surface 38 (e.g., six millimeters). Moreover, the second edge 32 is thus moldably connected to and spaced apart from third edge 40 by the second surface 34, wall section 36, and third surface 38. In addition, the third edge 40 is moldably connected to and spaced apart from floor 18 by a vertical lower portion 42 of sidewall 20. As a result, ultimately, the surface of center console 14 is moldably connected to and horizontally and vertically spaced apart from floor 18 by a combination of the first surface 28, second surface 34, wall section 36, and third surface 38.

The sleeve 16 encapsulates the upper portion of the receptacle sidewall 20 and is defined by a sleeve sidewall 44 and two vertically spaced apart openings—a top sleeve opening 44 and bottom sleeve opening 46. Moreover, sleeve 16 fits into opening receptacle opening 22 in such a way that it is permitted to rotate about a center axis 50. Therefore, when the beverage container is placed in receptacle 15, a portion of the container will slide through sleeve 16 and another portion of the container will have its perimeter completely surrounded by sleeve 16. In order to rotate, as such, the diameter of sleeve 16 should be larger than the diameter of the container. The sleeve 16 may be made from a rigid material such as, but not limited to, plastic, metal, fiberglass, or wood, or sleeve 16 may also be made from a more flexible material such as, but not limited to, an elastomer.

A lip 52 projects outward and laterally from sleeve 16 at the top opening 44. The lip 52 borders the first edge 26 and covers the first surface 28 of the receptacle sidewall 20. This orientation of lip 52 allows gasket 30, located on the first surface 28, to apply upward pressure on the sleeve 16 and create space between the receptacle 15 and sleeve 16. Gasket 30 may also be made of an elastomeric material to allow lip 52 to rotate about the center axis 50 and over the first surface 28 with reduced friction as well as allow sleeve 16 to get temporarily pressed downward and closer to receptacle 15.

The upper portion 24 of the receptacle sidewall 20 also includes a track 54 that spans along a defined length of the sidewall 20. This track 54 includes a number of vertically oriented side notches 56 (e.g., four) which may be evenly spaced from each other. The sleeve sidewall 44 includes a retention feature 58 (i.e., a peg) which is molded onto it and projects outward and away from center axis 50. As such, when sleeve 16 is at rest, and being pressed upward by gasket 30, retention feature 58 will be position in one of the notches 56. However, when sleeve 16 is pressed downward and made to rotate about center axis 50, retention feature 58 may travel along track 54, (i.e., sliding) until such downward pressing has been released and retention feature 58 moves into another one of the notches 56. Thus, when retention feature 58 is positioned within one of the notches 56, sleeve 16 is caused to be in a static position, which can be released when sleeve 16 is pressed back down and again made to rotate about center axis 50.

Numerous vertically oriented elastic bands 60 are connected to the receptacle sidewall 20 at one end and sleeve sidewall 44 at their opposite end. Furthermore, each band 60 is evenly spaced from the adjacent bands 60 along the interior of these sidewalls 20, 44 and is connected to the receptacle sidewall 20 and sleeved sidewall 44 through the implementation of orifices 62 and washers 64. Connecting the elastic bands 60 in this manner establishes a baseline amount of tension within each band 60 that forces the bands to remain tightly pressed against the interior of the receptacle sidewall 20 and sleeve sidewall 44. These elastic bands 60 may be made out of stretchable, flexible material such as, but not limited to, nylon.

Figure 4A:
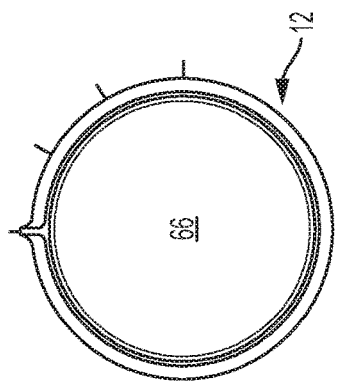
FIG. 4A shows a top-down view of the exemplary beverage container holding assembly of FIG. 2 according to one aspect.
Figure 4B:
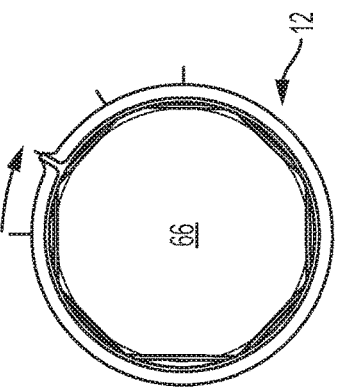
FIG. 4B shows a top-down view of the exemplary beverage container holding assembly of FIG. 2 according to another aspect.
Figure 4C:
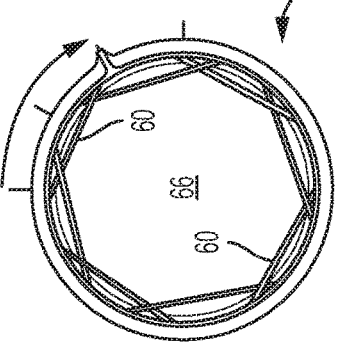
FIG. 4C shows a top-down view of the exemplary beverage container holding assembly of FIG. 2 according to another aspect.
Figure 4D:
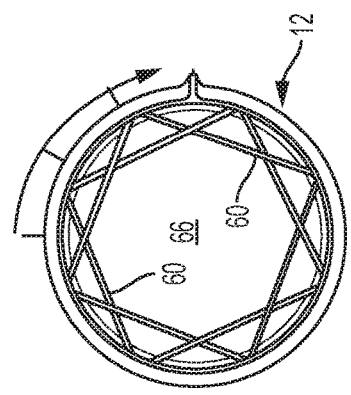
FIG. 4D shows a top-down view of the exemplary beverage container holding assembly of FIG. 2 according to another aspect.

As can be understood by referencing FIGS. 4A though 4D, as a user of holding assembly 12 twists sleeve 16 and causes the sleeve 16 to rotate, one end of each band 60 will move about center axis 50 with the sleeve sidewall 44 while the opposite end remains stationary at its original location along receptacle sidewall 20 to create a pivot point. Such movement causes the end of each of the bands 60 connected to sleeve sidewall 16 to move a few degrees towards a horizontal and, in turn, causes each band 60 to rotate relative to its pivot point plane (as can be seen in FIG. 3). Such movement also causes the bands 60 to stretch from end to end as they rotate and causes the tension within each band 60 to grow. As a result, each band 60 becomes tighter and such tightness forces the bands 60 to space apart from the sidewalls 20, 44. As this distance is created and each band 60 moves away from the sidewalls 20, 44, the bands collaborate to operatively form into a configuration of overlapping bands which ultimately constricts an area 66 centrally located within the receptacle member 15 and sleeve member 16 and which surrounds the center axis 50 (FIG. 4D).

Figure 5A:
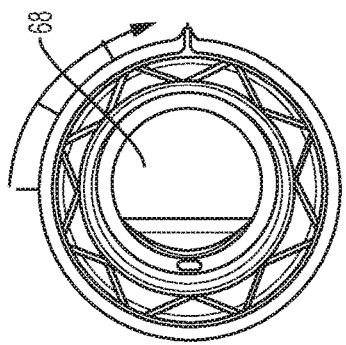
FIG. 5A shows a top-down view of the exemplary beverage container holding assembly of FIG. 2 and beverage container according to one aspect.
Figure 5B:
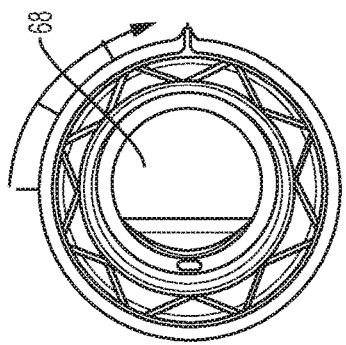
FIG. 5B shows a top-down view of the exemplary beverage container holding assembly of FIG. 2 and beverage container according to another aspect.
Figure 5C:
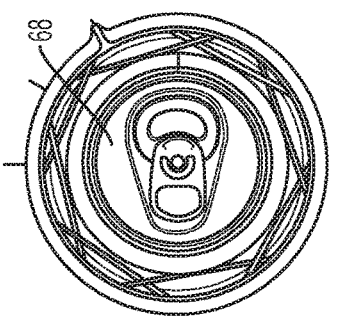
FIG. 5C shows a top-down view of the exemplary beverage container holding assembly of FIG. 2 and beverage container according to another aspect.
Figure 5D:
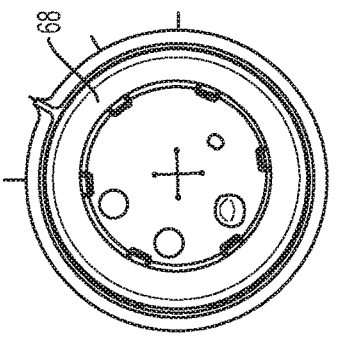
FIG. 5D shows a top-down view of the exemplary beverage container holding assembly of FIG. 2 and beverage container according to another aspect.

As can be understood by referencing FIGS. 5A though 5D, rotation of sleeve 16 can be segmented based on the locations of each side notch 56 (indicated by the marks around holding assembly 12). Thus, constriction of area 66 can be segmented and intended to fit around the perimeters of various beverage containers 68. For example, when sleeve 16 is at its default orientation, having the bands 60 remain vertically oriented and area 66 unrestricted, holding assembly 12 may thus be tailored to hold wide containers such as large volume insulated bottles (FIG. 5A). Alternatively, when sleeve 16 is rotated to a first segment orientation, having bands 60 stretched and spaced apart from the sidewalls 20, 44 to slightly constrict area 66, holding assembly 12 may be tailored to hold containers with a smaller diameter such as coffee cups, fountain beverage cups, or soda cans (FIGS. 5B and 5C). However, when sleeve 16 is rotated to the point retention feature 58 meets the end of track 54 and area 66 is fully constricted, holding assembly 12 may be tailored to hold containers with very small diameters such as miniature coffee cups (FIG. 5D).

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

None of the elements recited in the claims are intended to be a means-plus-function element within the meaning of 35 U.S.C. § 112(f) unless an element is expressly recited using the phrase "means for," or in the case of a method claim using the phrases "operation for" or "step for" in the claim.

What is claimed is:

1. A beverage container holder comprising:
a first member including a floor, sidewall, and first opening, the floor connected and spaced apart from the first opening by the first member sidewall to define a receptacle to receive the beverage container therein;
a second member, wherein a portion of the second member is inserted into the first opening of the first member to permit rotation of the second member about a center axis;
a plurality of elastic bands, each elastic band of the plurality of elastic bands being connected to the first member at one end and the second member at the opposite end such that tension is established within each elastic band of the plurality of elastic bands;
wherein, as the second member is caused to rotate about the center axis, the tension in each elastic band grows and the plurality of elastic bands collaborate to operatively form into a configuration which constricts an area centrally located in the receptacle of the first member;
wherein the second member includes a second opening, sidewall, and third opening, the second opening connected and spaced apart from the third opening by the second member sidewall to define a rounded sleeve to surround a portion of the beverage container when the beverage container is received by the receptacle of the first member;
wherein each of the elastic bands are connected to the first member sidewall and the second member sidewalk;
the first member sidewall further includes a track having a plurality of side notches;
the second member sidewall includes a retention feature that projects outward, the retention feature can travel along the track of the first member sidewall as the second member is caused to rotate about the center axis, the retention feature is adapted to engage each of the side notches, and wherein retention feature engagement for each side notch causes the second member to maintain a releasably static position during rotation about the center axis;
wherein the first member sidewall further includes a first edge having a first diameter to define the first opening of the first member, a first surface, and a second edge having a second diameter, the first edge connected and spaced apart from the second edge by the first surface, and the first diameter is larger than the second diameter; and
wherein the first member sidewall further includes a second surface, third surface, and third edge having a third diameter, the second edge connected to and spaced apart from the third edge by the second surface and third surface, the second surface is diagonally oriented in relation to the second edge and the third surface, and the second diameter is larger than the third diameter.

2. The beverage container holder of claim 1, wherein the second member further includes a lateral lip projecting outward from the second opening, the lip borders the first edge of the first member sidewall and covers the first surface of the first member sidewall.

3. The beverage container holder of claim 2, wherein a gasket is positioned on the first surface of the first member to separate the first member and second member via the lip.

4. The beverage container holder of claim 3, wherein the gasket is made from elastomeric material.

5. The beverage container holder of claim 1, wherein the first member is molded into a surface of a vehicle interior.

6. The beverage container holder of claim 1, wherein each elastic band is connected to the first member via a washer.

7. The beverage container holder of claim 1, wherein each elastic band is made from nylon.

8. A beverage container holder comprising:
a first member molded into a surface of a vehicle interior, the first member including a floor, sidewall, and first opening, the floor connected and spaced apart from the first opening by the first member sidewall to define a rounded receptacle to receive the beverage container therein;
the first member sidewall includes a track having a plurality of side notches, a first edge having a first diameter to define the first opening of the first member, a first surface, and a second edge having a second diameter, the first edge connected and spaced apart from the second edge by the first surface, and the first diameter is larger than the second diameter;
the first member sidewall further includes a second surface, third surface, and third edge having a third diameter, the second edge connected to and spaced apart from the third edge by the second surface and third surface, the second surface is diagonally oriented in relation to the second edge and the third surface, and the second diameter is larger than the third diameter;
a second member including a second opening, sidewall, and third opening, the second opening connected and spaced apart from the third opening by the second member sidewall to define a rounded sleeve, the sleeve is inserted into the first opening of the first member to permit rotation of the second member about a center axis, and the second member sleeve surrounds a portion of the beverage container when the beverage container is received by the receptacle of the first member;
the second member further includes a lateral lip projecting outward from the second opening of the second member, the lip borders the first edge of the first member sidewall and covers the first surface of the first member;
the second member sidewall includes a retention feature that projects outward, the retention feature can travel along the track of the first member sidewall as the second member is caused to rotate about the center axis, the retention feature is adapted to engage each of the side notches, and wherein retention feature engagement for each side notch causes the second member to maintain a releasably static position during rotation about the center axis;
an elastomeric gasket positioned on the first surface of the first member to separate the first member and second member via the lip;
a plurality of nylon bands, each nylon band of the plurality of nylon bands being connected to the first member sidewall at one end via a washer and the second member sidewall at the opposite end such that tension is established within each nylon band of the plurality of nylon bands; and
wherein, as the second member is caused to rotate about the center axis, the tension in each nylon band grows and the plurality of nylon bands collaborate to operatively form into a configuration which constricts an area centrally located in the receptacle of the first member.

9. A surface positioned in an interior of a vehicle, the surface comprising:
a first member molded into the surface, the first member including a floor, sidewall, and first opening, the floor connected and spaced apart from the first opening by the first member sidewall to define a rounded receptacle to receive the beverage container therein;
the first member sidewall includes a first edge having a first diameter to define the first opening of the first member, a first surface, and a second edge having a second diameter, the first edge connected and spaced apart from the second edge by the first surface, and the first diameter is larger than the second diameter;
the first member sidewall further includes a second surface, third surface, and third edge having a third diameter, the second edge connected to and spaced apart from the third edge by the second surface and third surface, the second surface is diagonally oriented in relation to the second edge and the third surface, and the second diameter is larger than the third diameter;
the first opening adapted to receive a rounded sleeve of a second member and permit rotation of the second member about a center axis, the sleeve including a second opening, sidewall, and third opening, the second opening connected and spaced apart from the third opening by the second member sidewall to define the sleeve, and the sleeve being adapted to surround a portion of the beverage container after the beverage container is received by the receptacle of the first member; and
the first member sidewall adapted to connect to one end of each elastic band of a plurality of elastic bands, wherein the opposite end of each elastic band of the plurality of elastic bands is connected to the second member sidewall such that tension is established within each elastic band of the plurality of elastic bands when the sleeve of the second member is received by the first opening, and wherein, as the second member is caused to rotate about the center axis, the tension in each elastic band grows and the plurality of elastic bands are caused to collaborate to operatively form into a configuration which constricts an area centrally located in the receptacle of the first member.

10. The surface of claim 9, wherein:
the first member sidewall further includes a track having a plurality of side notches;
the second member sidewall includes a retention feature that projects outward; and
the track adapted to allow the retention feature to travel along a defined path as the second member is caused to rotate about the center axis and to allow engagement with each of the side notches to cause the second member to maintain a releasably static position during rotation about the center axis.

11. The surface of claim 9, wherein:
the second member further includes a lateral lip projecting outward from the second opening; and
the first edge of the first member sidewall adapted to border the perimeter of the lip after the first opening receives the sleeve of the second member; and
the first surface of the first member sidewall adapted to be covered by the lip after the first opening receives the sleeve of the second member.

12. The surface of claim 9, wherein each elastic band can be connected to the first member via a washer.

13. The surface of claim 9, wherein the first surface is adapted to include a gasket to separate the first member from the second member after the first opening receives the sleeve of the second member.

14. The surface of claim 13, wherein the gasket is made from elastomeric material.

15. The surface of claim 9, wherein each elastic band is made from nylon.

\* \* \* \* \*